US009915359B2

(12) United States Patent
Ricard et al.

(10) Patent No.: US 9,915,359 B2
(45) Date of Patent: Mar. 13, 2018

(54) DOUBLE PISTON EFFECT LIP SEAL SEATING ASSEMBLIES

(71) Applicant: Cameron International Corporation, Houston, TX (US)

(72) Inventors: Philippe Ode Daniel Ricard, Aix-en-Provence (FR); Christophe Avdjian, Meyreuil (FR)

(73) Assignee: Cameron International Corporation, Houston, TX (US)

( * ) Notice: Subject to any disclaimer, the term of this patent is extended or adjusted under 35 U.S.C. 154(b) by 12 days.

(21) Appl. No.: 14/965,681

(22) Filed: Dec. 10, 2015

(65) Prior Publication Data
US 2016/0186870 A1    Jun. 30, 2016

(30) Foreign Application Priority Data

Dec. 31, 2014   (EP) .................................... 14307230

(51) Int. Cl.
*F16K 5/20*    (2006.01)
*F16K 5/06*    (2006.01)

(52) U.S. Cl.
CPC ............ *F16K 5/205* (2013.01); *F16K 5/0673* (2013.01); *F16K 5/0678* (2013.01); *F16K 5/0689* (2013.01)

(58) Field of Classification Search
CPC . F16K 5/20; F16K 5/201; F16K 5/204; F16K 5/205; F16K 5/0678; F16K 5/0673; F16K 5/0689
USPC ........ 251/159, 170, 172, 174, 175, 176, 185
See application file for complete search history.

(56) References Cited

U.S. PATENT DOCUMENTS

| | | | | | |
|---|---|---|---|---|---|
| 3,097,823 | A | * | 7/1963 | Rudolf .................. | F16K 5/0678 251/172 |
| 3,114,386 | A | * | 12/1963 | Dumm .................. | F16K 5/0678 137/316 |
| 3,378,026 | A | * | 4/1968 | Oliver .................. | F16K 5/0673 137/246.22 |
| 3,379,410 | A | * | 4/1968 | Stewart, Jr. ........... | F16K 5/0673 137/119.08 |
| 3,392,743 | A | * | 7/1968 | Pennington ............. | F16K 5/227 137/246.2 |
| 3,414,233 | A | * | 12/1968 | Priese ................... | F16K 5/0678 251/172 |
| 3,421,733 | A | * | 1/1969 | Stewart, Jr. ........... | F16K 5/0673 251/172 |
| 3,504,885 | A | * | 4/1970 | Hulsey .................. | F16K 3/0227 251/172 |

(Continued)

FOREIGN PATENT DOCUMENTS

WO    WO 2013066187 A1 *  5/2013   ........... F16K 5/0678

*Primary Examiner* — Reinaldo Sanchez-Medina
*Assistant Examiner* — David Colon Morales
(74) *Attorney, Agent, or Firm* — Eubanks PLLC

(57) ABSTRACT

A valve including a double piston effect seat assembly with unidirectional lip seals is provided. In one embodiment, a valve includes a ball disposed in a cavity of a hollow valve body. The ball includes a flow port and is rotatable to control flow through the valve. The valve also includes a seat assembly having a seat in contact with the ball, a ring positioned on an opposite side of the seat from the ball, and unidirectional lip seals. The seat assembly is a double piston seat assembly, with the double piston effect provided by the arrangement of the seat, the ring, and the unidirectional lip seals. Additional valve systems, devices, and methods are also disclosed.

14 Claims, 4 Drawing Sheets

(56) References Cited

U.S. PATENT DOCUMENTS

| | | | | |
|---|---|---|---|---|
| 3,521,855 A * | 7/1970 | Jensen | F16K 5/0673 | 251/172 |
| 3,542,054 A * | 11/1970 | Works | F16K 5/227 | 137/246.22 |
| 3,656,498 A * | 4/1972 | Grove | F16K 5/0673 | 137/246.22 |
| 3,667,727 A * | 6/1972 | Bowden | F16K 5/0673 | 251/172 |
| 3,746,303 A * | 7/1973 | Grove | F16K 3/0227 | 251/159 |
| 3,749,357 A * | 7/1973 | Fowler | F16K 3/207 | 251/172 |
| 3,776,506 A * | 12/1973 | Fowler | F16K 5/205 | 251/172 |
| 3,794,291 A * | 2/1974 | Suyama | F16K 5/0673 | 251/171 |
| 3,834,664 A * | 9/1974 | Atkinson | F16K 5/0673 | 251/172 |
| 3,856,261 A * | 12/1974 | Jourdan | F16K 5/205 | 137/112 |
| 4,083,376 A * | 4/1978 | Alaniz | F16K 5/0673 | 137/246.22 |
| 4,084,608 A * | 4/1978 | Laignel | F16K 5/0673 | 137/246.22 |
| 4,137,936 A * | 2/1979 | Sekimoto | F16K 5/0673 | 137/246.22 |
| 4,155,536 A * | 5/1979 | Saiki | F16K 5/0673 | 251/174 |
| 4,266,566 A * | 5/1981 | Kacal | F16K 5/201 | 137/316 |
| 4,280,522 A * | 7/1981 | Pechnyo | F16K 5/0673 | 137/72 |
| 4,290,581 A * | 9/1981 | Moran | F16K 5/0673 | 251/172 |
| 4,318,420 A * | 3/1982 | Calvert | F16K 5/0673 | 137/74 |
| 4,319,734 A * | 3/1982 | Acar | F16K 5/0678 | 251/174 |
| 4,483,511 A * | 11/1984 | Kushida | F16K 5/0673 | 251/172 |
| 4,509,546 A * | 4/1985 | Brookes | F16K 5/0673 | 137/74 |
| 4,566,482 A * | 1/1986 | Stunkard | F16K 5/0636 | 137/240 |
| 4,658,847 A * | 4/1987 | McCrone | E06B 5/164 | 137/72 |
| 4,673,164 A * | 6/1987 | Nakanishi | F16K 5/0673 | 251/174 |
| 4,718,444 A * | 1/1988 | Boelte | F16K 5/0636 | 137/15.22 |
| 4,747,578 A * | 5/1988 | Kivipelto | F16K 5/207 | 251/159 |
| 5,163,655 A * | 11/1992 | Chickering | F16K 5/201 | 251/174 |
| 5,338,003 A * | 8/1994 | Beson | F16K 3/205 | 251/172 |
| 5,419,532 A * | 5/1995 | Fan | F16K 5/0673 | 251/315.08 |
| 5,533,738 A * | 7/1996 | Hoffmann | F16K 5/205 | 251/172 |
| 5,624,101 A * | 4/1997 | Beson | F16K 3/20 | 251/172 |
| 6,340,029 B1 * | 1/2002 | Jun | F16K 1/228 | 137/1 |
| 6,345,805 B1 * | 2/2002 | Chatufale | F16K 5/0471 | 251/172 |
| 6,966,537 B2 * | 11/2005 | Sundararajan | F16K 3/207 | 251/172 |
| 7,004,451 B2 * | 2/2006 | Malischewsky | F16K 5/205 | 251/161 |
| 7,032,880 B2 * | 4/2006 | Scaramucci | F16K 5/0678 | 251/172 |
| 7,275,564 B2 * | 10/2007 | Bazin | F16K 5/201 | 137/625.47 |
| 7,484,710 B2 * | 2/2009 | Koester | F16K 5/0678 | 251/160 |
| 7,988,127 B2 * | 8/2011 | Parra | F16K 5/0673 | 251/172 |
| 8,113,484 B2 * | 2/2012 | Hostetter | F16K 5/0678 | 251/174 |
| 8,490,945 B2 * | 7/2013 | Keeper | F16K 5/188 | 251/172 |
| 8,496,226 B2 * | 7/2013 | Dalluge | F16K 5/0636 | 251/159 |
| 8,727,314 B2 | 5/2014 | Avdjian | | |
| 8,794,253 B2 | 8/2014 | Avdjian et al. | | |
| 8,978,691 B2 | 3/2015 | Avdjian et al. | | |
| 8,985,136 B2 | 3/2015 | Avdjian et al. | | |
| 2003/0178595 A1 | 9/2003 | Koester et al. | | |
| 2004/0140445 A1 * | 7/2004 | Pervaiz | F16K 5/0478 | 251/160 |
| 2006/0231786 A1 * | 10/2006 | Witt | F16K 5/0678 | 251/174 |
| 2007/0278438 A1 * | 12/2007 | Scott | F16K 5/205 | 251/172 |
| 2010/0276620 A1 * | 11/2010 | Ezekiel | F16K 5/204 | 251/172 |
| 2011/0037010 A1 * | 2/2011 | Parks, Jr. | F16K 3/0236 | 251/328 |
| 2011/0266482 A1 * | 11/2011 | Dalluge | F16K 5/0668 | 251/315.01 |
| 2012/0145938 A1 | 6/2012 | Avdjian | | |
| 2012/0211690 A1 * | 8/2012 | Anderson | F16K 5/0678 | 251/315.1 |
| 2014/0054483 A1 | 2/2014 | Avdjian | | |
| 2014/0239212 A1 | 8/2014 | Håland | | |

\* cited by examiner

DOUBLE PISTON EFFECT LIP SEAL SEATING ASSEMBLIES

TECHNICAL FIELD

Embodiments of the present disclosure generally relate to seating assemblies for fluid flow control devices, such as ball valves.

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies often invest significant amounts of time and money in finding and extracting oil, natural gas, and other subterranean resources from the earth. Particularly, once desired subterranean resources such as oil or natural gas are discovered, drilling and production systems are often used to access and extract the resources. These systems may be located onshore or offshore depending on the locations of the desired resources. And once extracted, the resources are often transported via pipelines to desired locations, such as refineries. The pipelines typically include valves to control the flow of resources through the pipelines.

As may be appreciated, valves include flow control mechanisms for selectively allowing flow through the valves. For instance, ball valves include balls that may be rotated between open and closed positions to allow or inhibit flow through the valves. The ball valves also have seat assemblies that seal against the balls. In some instances, ball valve seat assemblies are single piston effect seat assemblies or double piston effect seat assemblies. In a single piston effect seat assembly, line pressure in the flow conduit of the valve on one side of the sealing interface between a seat of the assembly and the ball is used to push the seat against the ball. Sufficiently high pressure on the opposite side of the seat (within the ball cavity of the valve) will push the seat away from the ball and relieve pressure from the ball cavity. For this reason, single piston effect seat assemblies are also referred to as self-relieving seat assemblies. In a double piston effect seat assembly, pressure on either side of the sealing interface between the seat and the ball is used to push the seat against the ball.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

At least some embodiments of the present disclosure generally relate to ball valves and double piston effect seating assemblies of the ball valves. In certain embodiments, a double piston effect seating assembly includes a seat, a piston ring, and unidirectional lip seals. The seating assembly is positioned in a recess of a valve connector or other valve component and allowed to float in response to pressures in the valve. The arrangement of the seat, the piston ring, and the unidirectional lip seals within the recess provide the double piston effect. The unidirectional lip seals are oriented in different directions within the recess to inhibit flow of fluid in certain directions past the seals. The piston thrust effect of the seating assembly is used to increase sealing contact pressure between the seat and a flow control ball in the valve and maintain sealing of the seat against the ball in various pressure conditions.

Various refinements of the features noted above may exist in relation to various aspects of the present embodiments. Further features may also be incorporated in these various aspects. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION OF SPECIFIC EMBODIMENTS

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

Figure 1:
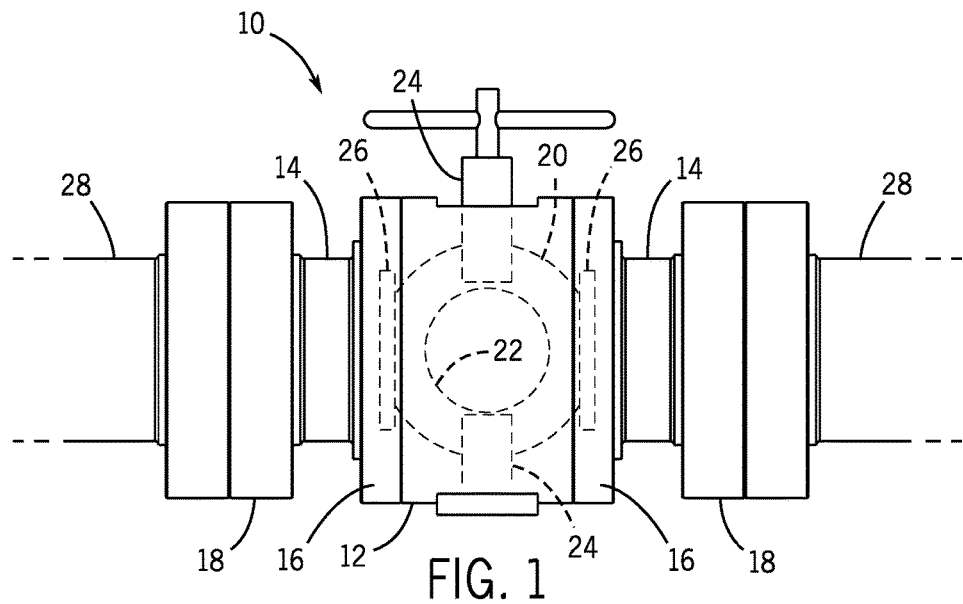
FIG. 1 is an elevational view of a ball valve connected between two pipes, the ball valve including a body disposed between two fluid conduit connectors and seat assemblies for sealing against a flow control ball, in accordance with certain embodiments of the present disclosure.

Turning now to the drawings, a ball valve 10 is illustrated in FIG. 1 by way of example. The ball valve 10 includes a hollow body 12 disposed between two connectors 14. As depicted here, the connectors 14 each include flanges 16 and 18 to facilitate coupling of the connectors between the body 12 and pipes 28. The valve 10 also includes a flow control ball 20 inside a cavity of the body 12. The ball 20 has a flow port 22 and can be rotated between open and closed positions to control flow between the pipes 28 through the valve 10. Stems or trunnions 24 generally hold the ball 20 in place within the cavity of the body 12, while still allowing rotation of the ball 20 about an axis through the stems.

The ball valve 10 includes seat assemblies 26 that seal against the ball 20. In some embodiments, both of the depicted seat assemblies 26 are double piston effect seat assemblies. In other embodiments, only one of the seat assemblies 26 is a double piston effect seat assembly. The other seat assembly 26 could instead be a single piston effect seat assembly, for instance. Examples of double piston effect seat assemblies that could be used for one or both of the seat assemblies 26 are depicted in FIGS. 2-7.

Figure 2:
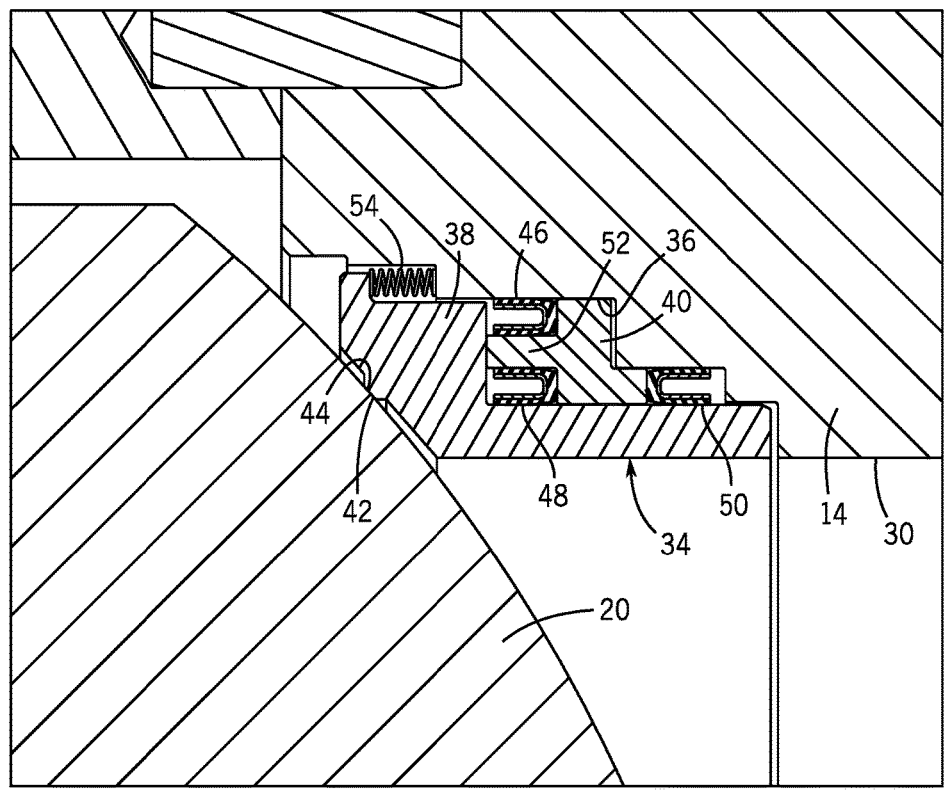
FIG. 2 is a section view of a portion of a ball valve and depicts a double piston effect seat assembly having multiple lip seals in accordance with one embodiment.
Figure 3:
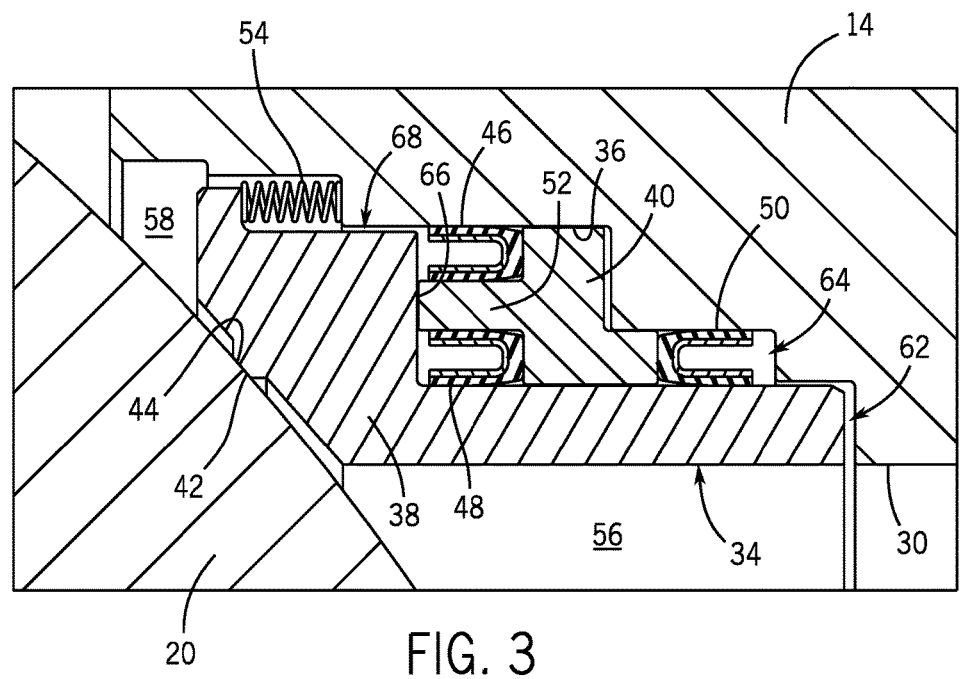
FIG. 3 is a detail view of the seat assembly of FIG. 2, and generally depicts the seat assembly as it is pushed against the ball as a result of line pressure in a flow conduit of the valve.
Figure 4:
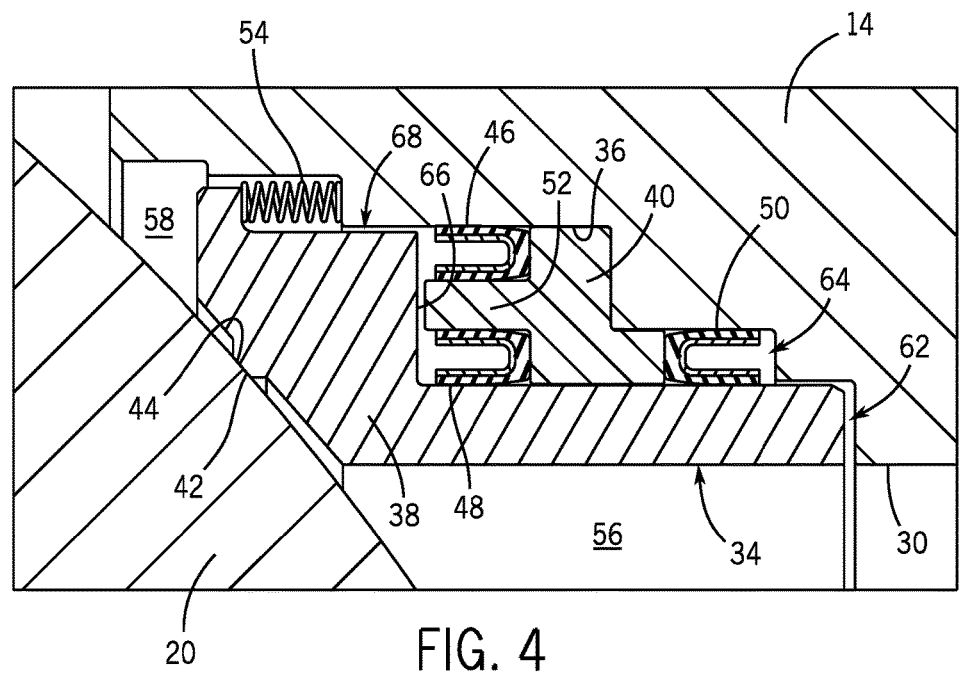
FIG. 4 is similar to the detail view of FIG. 3, but generally depicts the seat assembly as it is pushed against the ball as a result of pressure from inside the ball cavity of the valve.

In one example generally depicted in FIGS. 2-4, a seat assembly 34 of a valve 10 is positioned in a recess 36 of a connector 14 along a flow conduit 30 through the valve. Fluid could flow through the flow conduit 30 in either direction during operation, and the depicted seat assembly 34 could be an upstream seat assembly or a downstream seat assembly with respect to the ball 20. The seat assembly 34 includes an annular seat 38 and a piston ring 40. A sealing interface between the seat 38 and the ball 20 includes mating sealing surfaces 42 and 44. In the presently depicted embodiment, the annular seat 38 seals directly against the ball 20 (e.g., a metal-to-metal seal). But in other embodiments, the seat 38 includes an insert (e.g., an elastomer ring) in a recess of the seat 38 and it is the insert that includes the sealing surface 42. As described in greater detail below, in at least some operating conditions the piston ring 40 increases sealing contact pressure of the seat 38 against the ball 20.

The seat assembly 34 also includes seals 46, 48, and 50. The seals 46, 48, and 50 are unidirectional lip seals having lips for sealing against two opposing surfaces and inhibiting fluid flow in one direction. As shown here, the seals 46, 48, and 50 are U-shaped lip seals (more specifically, an annular seal with a U-shaped cross-section) having a resilient body and an inner spring to bias the sealing lips of the body against the opposing surfaces. These U-shaped lip seals can be considered to have an open end at the distal ends of the lips and a closed end at the base of the U-shape opposite the distal ends of the lips.

In operation, pressure received between the two lips through the open end pushes the lips outward and increases sealing pressure of the lips against the opposing surfaces. Thus, high pressure at the open end promotes additional sealing and inhibits leakage from the open end to the closed end along the outside of the lips. But pressure on the other side of the seal can enter between the lips and the opposing surfaces and push inwardly against the lips. If a sufficient pressure differential exists between fluid at the closed end of the seal and the fluid at the open end of the seal, the pressure differential will cause fluid to flow past the arms from the closed end toward the open end of the seal. Consequently, these seals are designed to prevent flow from one direction while allowing flow from the opposite direction, and are considered unidirectional seals (even though small pressure differentials between the closed and open ends may not be sufficient to overcome biasing pressure on the lips to push the lips inwardly and cause flow in the opposite direction). This is in contrast to bidirectional seals (e.g., an annular seal having an X-shaped cross-section with four sealing lips) that seal against pressure in either direction.

As shown in FIGS. 2-4, the seals 46 and 48 are positioned at a front side of the ring 40 (closer to the ball 20) and the seal 50 is positioned at a rear side of the ring 40 (further from the ball 20). More specifically, the seals 46 and 48 are provided on opposite surfaces of an axial flange 52, with the radially inward surface of the seal 46 sealing against the outer circumference of the flange 52 and the radially outward surface of the seal 48 sealing against the inner circumference of the flange 52. The outer surface of the seal 46 seals against the connector 14, and the inner surface of the seal 48 seals against the seat 38. The depicted seal 50 seals against the connector 14 with its outer edge, and against the seat 38 with its inner edge. One or more springs 54 bias the seat 38 axially inward toward the ball 20. This provides closing pressure to the seat 38 in the case of low fluid pressure within the valve. And although shown here as a coil spring, any suitable springs 54 could be used.

As illustrated in FIGS. 3 and 4, the sealing interface between the seat 38 and the ball 20 at mating surfaces 42 and 44 separates fluid in a region 56 (in the flow conduit 30) on one side of the interface from fluid in a region 58 (in the cavity of the body 12) on the other side of the interface. The arrangement of the seat 38, the ring 40, and the seals 46, 48, and 50 provide the seat assembly 34 with a double piston effect, in which pressure from either direction (from the region 56 or from the region 58) is routed behind the seat 38 and used to push the seat 38 toward the ball 20 to increase sealing contact pressure between mating surfaces 42 and 44. Fluid from the region 56 is allowed to flow through passage 62 between the seat 38 and the connector 14 and into a region 64 behind the seat 38 and between the seal 50 and the connector 14. The seal 50 is oriented to inhibit flow from the region 64 to the ring 40. Fluid from the region 58 is allowed to flow to a region along a shoulder 66 of the seat 38 through a passage 68, and the seals 46 and 48 are oriented in an opposite direction than that of the seal 50 to inhibit flow past the seals 46 and 48 in the direction away from the ball 20. In at least some embodiments, the ring 40 is allowed to freely float between the connector 14 and the seat 38, moving axially toward or away from the ball 20 depending on pressures in regions 56 and 58.

Pressure in the region 64 pushes the seal 50 inward against the ring 40 in the direction of the ball 20. Pressure between the shoulder 66 and the seal 46, the seal 48, and the end of the axial flange 52 pushes the seat 38 inward toward the ball 20 and also pushes the seal 46, the seal 48, and the ring 40 outward away from the ball. When a positive pressure differential between the region 56 and the region 58 is sufficiently high (i.e., when the pressure differential causes axially inward force on the ring 40 to exceed axially outward force on the ring 40 and overcomes frictional forces), fluid pressure in the region 64 drives the seal 50 against the ring 40. This causes the ring 40 to be driven into the seat 38 and the seat 38 into the ball 20 to increase sealing contact pressure of the seat against the ball at sealing surfaces 42 and 44. An example of this is depicted in FIG. 3. In other instances, pressure differences between the regions 56 and 58 will cause axially outward force on the ring 40 to exceed the inward force, pushing the seals and the ring 40 away from the ball 20, as shown in FIG. 4. But in such cases (and assuming the surface area of the shoulder 66 on which the pressure acts is greater than the effective (projected) area of the front end of the seat 38 on which the pressure also acts), the pressure along the shoulder 66 pushes the seat 38 in the direction of the ball 20 to maintain sealing between surfaces 42 and 44 and increase sealing contact pressure.

In some instances, each of the seat assemblies 26 could be provided as a seat assembly 34. During operation with the ball 20 closed, line pressure in the flow conduit 30 passes into region 64 of the upstream seat assembly 34 and drives the upstream seat 38 against the ball 20. If the upstream seat 38 did not create an effective seal for some reason (e.g., due to wear or damage), pressurized fluid would flow past the upstream seat 38 into the cavity of the body 12. This would lead to increased pressure along the shoulder 66 of the seat 38 of the downstream seat assembly 34, causing the downstream seat 38 to be driven more tightly against the ball 20.

Figure 5:
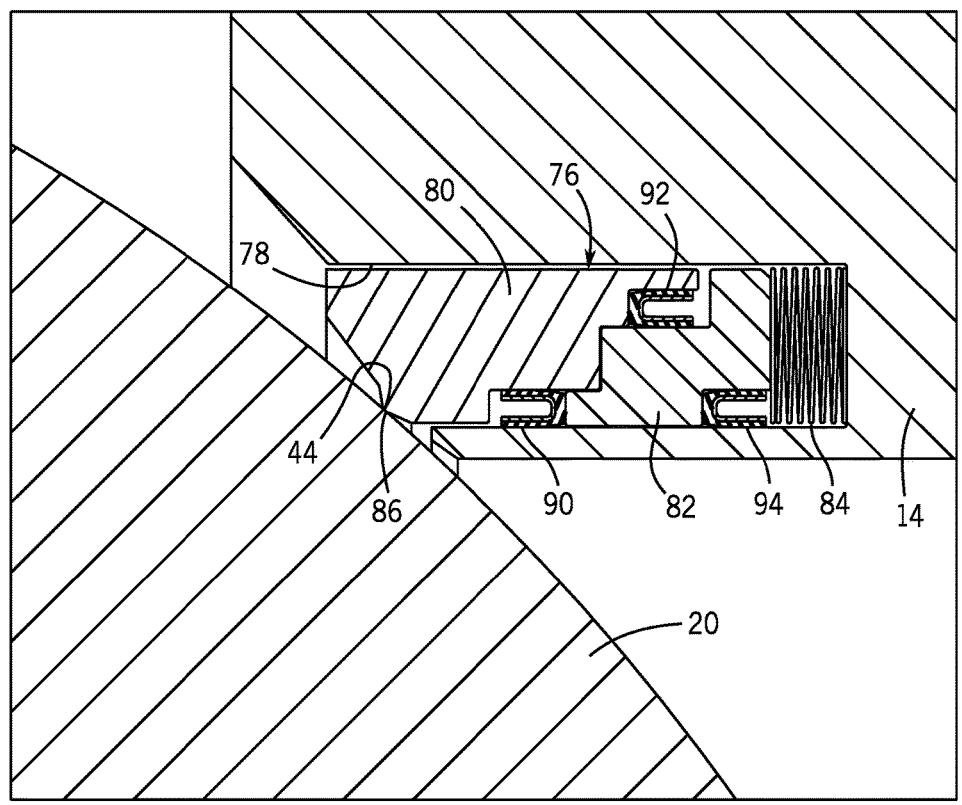
FIG. 5 is a section view of a portion of a ball valve and depicts a different double piston effect seat assembly having multiple lip seals in accordance with one embodiment.
Figure 6:
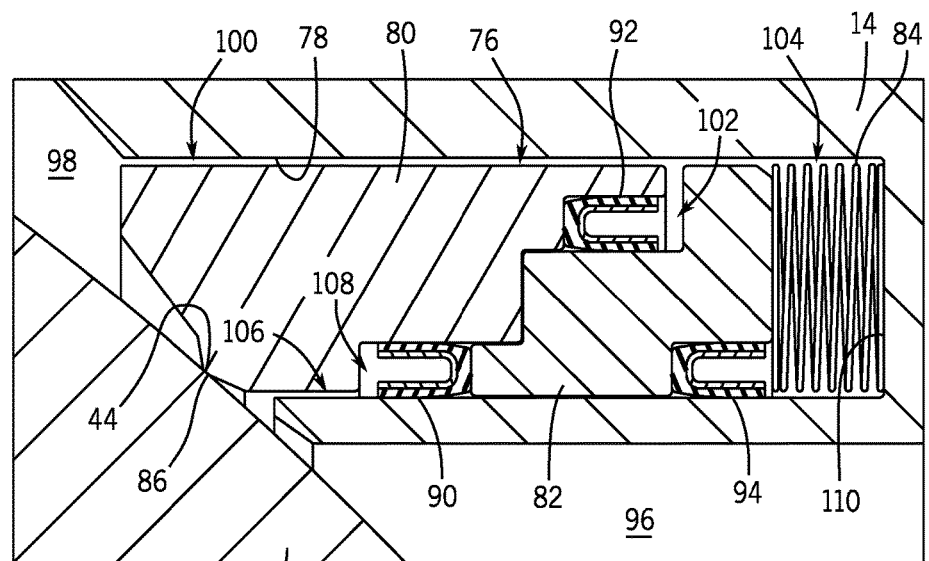
FIG. 6 is a detail view of the seat assembly of FIG. 5, and generally depicts the seat assembly as it is pushed against the ball as a result of pressure in the ball cavity of the valve.
Figure 7:
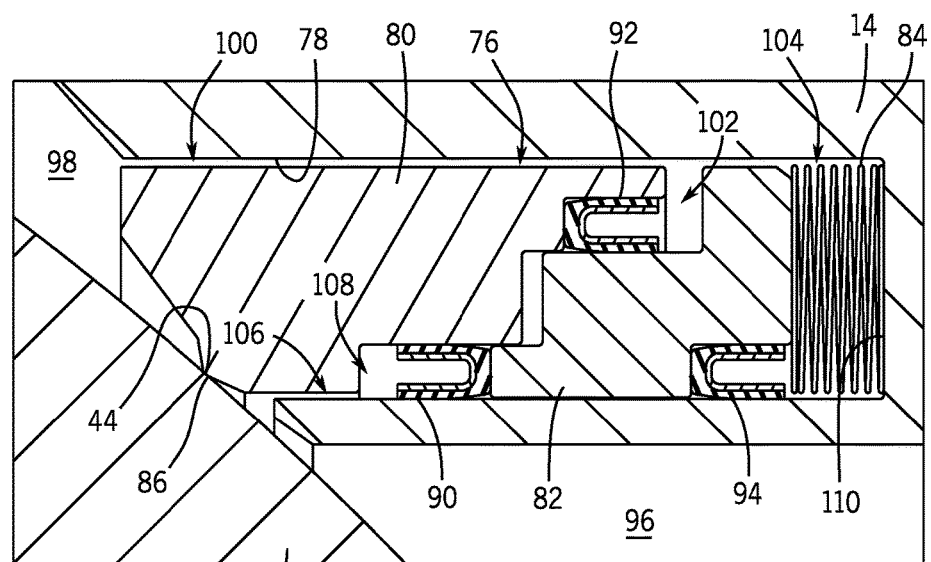
FIG. 7 is similar to the detail view of FIG. 6, but generally depicts the seat assembly as it is pushed against the ball as a result of line pressure from the flow conduit of the valve.

Another example of a double piston effect seat assembly that can be used in the valve 10 (for either or both seat assemblies 26) is generally depicted in FIGS. 5-7. In this embodiment, a seat assembly 76 is positioned inside a recess 78 of the connector 14. The recess 78 can take any suitable form, but in the presently depicted embodiment the recess 78 is an annular groove in the connector 14. As above, the seat assembly 76 could be an upstream seat assembly or a downstream seat assembly depending on the direction of flow through the valve. The seat assembly includes an annular seat 80 and a piston ring 82. The seat assembly is a double piston effect seat assembly, and pressure within the recess 78 pushes the seat 80 against the ball 20 to increase contact pressure at a sealing interface (between mating sealing surfaces 44 and 86). The seat 80 is shown in FIG. 5 as a single piece sealing directly against the ball 20. But in other embodiments the seat 80 could have multiple pieces, such as an insert that is carried by an annular body and seals against the ball 20. It will also be appreciated that the seat assembly 76 could be spring-biased (e.g., with one or more springs 84) toward the ball 20 to maintain sealing of the seat 80 against the ball 20 in low-pressure conditions.

The seat assembly 76 further includes seals 90, 92, and 94, which are depicted as unidirectional lip seals like seals 46, 48, and 50 described above. The seals 90 and 92 are positioned in front of the ring 82 next to the seat 80, and the seal 94 is positioned behind the seat 82. Moreover, the seal 90 is oriented in one direction to inhibit fluid flow in the recess 78 past the seal 90 in the direction away from the ball 20. In contrast, the seals 92 and 94 are oriented in the opposite direction to inhibit fluid flow in the recess past the seals 92 and 94 in the direction toward the ball 20.

As shown in FIGS. 6 and 7, the sealing interface between the ball 20 and the seat 80 (at mating surfaces 44 and 86) separates fluid in a region 96 in the flow conduit through the connector 14 from fluid in a region 98 of the ball cavity of the hollow valve body (between upstream and downstream seat assemblies). When pressure in the region 98 is sufficiently high compared to the pressure in the region 96, fluid flows from the region 98 through a passage 100 to both a region 102 between the seal 92 and the ring 82 and a region 104 behind the ring 82 and the seal 94 at the back of the recess 78. Pressure in the region 102 pushes the seat 80 toward the ball 20 and the ring 82 toward the back of the recess 78. But pressure in the region 104 overcomes the opposing pressure on the ring 82 from the region 102 and pushes the ring 82 against the seat 80 (and away from bottom 110 of the recess 78, as shown in FIG. 6) to drive the seat 80 against the ball 20, thus increasing sealing contact pressure of the seat against the ball. When pressure is the region 96 is sufficiently high compared to the pressure in region 98, fluid flows from the region 96 through a passage 106 to a region 108 between the seal 90 and the seat 80. The pressure in the region 108 drives the seat 80 against the ball 20 and increases the seating pressure. It also pushes the seal 90 into the ring 82, causing the ring 82 to separate from the seat 80 and move toward the bottom 110 of the recess 78, as shown in FIG. 7.

For both seat assembly 34 and seat assembly 76, the position of the sealing interface between the ball and the seat reduce the area on which fluids act on the front end of the seat assembly. Although fluids at the front ends push the assemblies in a direction away from the ball 20, the seals and other components of the assemblies 34 and 76 in the recesses of the connectors 14 allow pressure entering the recesses to generate greater inward forces toward the balls 20. The resulting (cumulative) forces push the seats of the assemblies against the balls 20 to maintain sealing and increase contact pressure between the mating surfaces of the seats and the balls 20.

Although certain examples are given above by way of explanation, it will be appreciated that other embodiments may differ. For instance, while the seat assemblies described above are positioned in recesses of the connectors 14, the seat assemblies could instead be received in other valve components, such as closure members or other intermediate components between the ball 20 and the connectors 14. In certain embodiments, the seat assemblies could be provided in recesses of a flow control ball 20, and the seat assemblies could operate such that the double piston effect instead pushes the seats outward from the ball 20 into sealing engagement against a connector or other valve component adjacent the ball 20. Further, although three unidirectional lip seals can be used to provide a compact and efficient floating seat assembly design with a double piston thrust effect, other embodiments could include a different number of unidirectional lip seals. Still further, the present techniques can be applied to any of a variety of differently sized ball valves for a range of intended operating pressures.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A valve comprising:
   a hollow valve body;
   a ball disposed in a cavity of the hollow valve body, wherein the ball includes a flow port and is rotatable for controlling flow through the valve; and
   a seat assembly including a seat in contact with the ball, a ring positioned on an opposite side of the seat from the ball, and unidirectional lip seals, wherein the seat assembly is a double piston effect seat assembly and the seat, the ring, and the unidirectional lip seals are positioned with respect to one another for providing the double piston effect, and wherein the ring includes an axial flange, and the unidirectional lip seals include a first unidirectional lip seal that seals against an inner surface of the axial flange and a second unidirectional lip seal that seals against an outer surface of the axial flange.

2. The valve of claim 1, comprising two connectors coupled to the hollow valve body, wherein the two connectors each include a conduit for routing flow through the valve and the seat assembly is positioned in a recess of a first connector of the two connectors.

3. The valve of claim 2, wherein the seat assembly and the recess of the first connector are configured to allow fluid from a first side of a sealing interface between the seat and the ball to enter a first region of the recess behind the seat to push the seat against the ball, and to allow fluid from a second side of the sealing interface between the seat and the ball to enter a second region of the recess behind the seat to push the seat against the ball.

4. The valve of claim 3, wherein the fluid from the first side of the sealing interface is fluid from the cavity of the hollow valve body, and the fluid from the second side of the sealing interface is fluid from the conduit of the first connector.

5. The valve of claim 2, wherein the unidirectional lip seals are positioned such that, during operation, the ring acts as a piston that drives the seat against the ball in response to fluid entering behind the ring from the conduit of the first connector.

6. The valve of claim 2, comprising an additional seat assembly positioned in a recess of a second connector of the two connectors.

7. The valve of claim 6, wherein the additional seat assembly positioned in the recess of the second connector also includes a seat in contact with the ball, a ring positioned on an opposite side of the seat from the ball, and unidirectional lip seals; the additional seat assembly is also a double piston effect seat assembly; and the seat, the ring, and the unidirectional lip seals of the additional seat assembly are positioned with respect to one another for providing the double piston effect.

8. The valve of claim 1, wherein the first unidirectional lip seal also seals against the seat.

9. The valve of claim 8, wherein the unidirectional lip seals include a third unidirectional lip seal that seals against the seat in an opposite directional orientation than that of the first unidirectional lip seal.

10. The valve of claim 1, comprising at least one spring that biases the seat toward the ball.

11. A method comprising:
receiving fluid in a ball valve disposed between first and second sections of a fluid conduit, the ball valve including a ball disposed in a valve body and a seat that seals against the ball; and
maintaining sealing of the seat against the ball during operation of the ball valve using a double piston effect seat assembly installed in a recess of a valve component, the double piston effect seat assembly including the seat, a piston ring, first and second lip seals oriented in opposite directions, and a third lip seal oriented in the same direction as the first lip seal, wherein the piston ring includes an axial flange, the first lip seal seals against an inner surface of the axial flange, and the third lip seal seals against an outer surface of the axial flange.

12. The method of claim 11, wherein maintaining sealing of the seat against the ball during operation of the ball valve using the double piston effect seat assembly includes allowing fluid pressure in a portion of the recess between the valve component and the first lip seal to drive the first lip seal into the piston ring such that the piston ring is driven into the seat so as to increase sealing contact pressure of the seat against the ball.

13. The method of claim 11, wherein maintaining sealing of the seat against the ball during operation of the ball valve using the double piston effect seat assembly includes allowing fluid pressure in a portion of the recess between the seat and the second lip seal to increase sealing contact pressure of the seat against the ball.

14. A valve comprising:
a hollow valve body;
a ball disposed in a cavity of the hollow valve body, wherein the ball includes a flow port and is rotatable for controlling flow through the valve; and
a seat assembly including a seat in contact with the ball, a ring positioned on an opposite side of the seat from the ball, and unidirectional lip seals, wherein the seat assembly is a double piston effect seat assembly and the seat, the ring, and the unidirectional lip seals are positioned with respect to one another for providing the double piston effect, and wherein the unidirectional lip seals include a first unidirectional lip seal that is positioned along and seals against a radially inward surface of the ring and a second unidirectional lip seal that is positioned along and seals against a radially outward surface of the ring.

* * * * *